United States Patent
Yoshida et al.

(10) Patent No.: US 10,974,388 B2
(45) Date of Patent: Apr. 13, 2021

(54) METHOD OF CORRECTING POSITION OF ROBOT AND ROBOT

(71) Applicants: KAWASAKI JUKOGYO KABUSHIKI KAISHA, Kobe (JP); KAWASAKI ROBOTICS (USA), INC., Wixom, MI (US)

(72) Inventors: Masaya Yoshida, Himeji (JP); Takao Yamaguchi, Fremont, CA (US); Hajime Nakahara, San Jose, CA (US); Daniel Chung, Castro Valley, CA (US)

(73) Assignees: KAWASAKI JUKOGYO KABUSHIKI KAISHA, Kobe (JP); KAWASAKI ROBOTICS (USA), INC., Wixom, MI (US)

( * ) Notice: Subject to any disclaimer, the term of this patent is extended or adjusted under 35 U.S.C. 154(b) by 257 days.

(21) Appl. No.: 16/234,339

(22) Filed: Dec. 27, 2018

(65) Prior Publication Data
US 2020/0206934 A1 Jul. 2, 2020

(51) Int. Cl.
*B25J 9/16* (2006.01)

(52) U.S. Cl.
CPC .......... *B25J 9/1692* (2013.01); *B25J 9/1612* (2013.01); *B25J 9/1653* (2013.01)

(58) Field of Classification Search
CPC ...... B25J 9/1692; B25J 9/1694; B25J 9/1653; B25J 9/1612; B25J 19/02; B25J 19/022; G05B 2219/39007; G05B 2219/39025
See application file for complete search history.

(56) References Cited

U.S. PATENT DOCUMENTS

| | | | |
|---|---|---|---|
| 9,796,086 B2 | 10/2017 | Nakaya et al. | |
| 2009/0157226 A1* | 6/2009 | de Smet | G01B 11/002 700/254 |
| 2016/0243703 A1* | 8/2016 | Kovacs | G01B 11/00 |
| 2021/0023713 A1* | 1/2021 | Zhang | B25J 13/084 |

* cited by examiner

*Primary Examiner* — Robert T Nguyen
(74) *Attorney, Agent, or Firm* — Oliff PLC

(57) ABSTRACT

A method of correcting a position of a robot includes: a correction step of rotating an arm around a first axis to detect a rotation angle around the first axis when a target blocks detection light, and locating the first axis, a third axis, and the target on an identical straight line by rotating the arm and/or a hand around the first axis, a second axis, and/or the third axis based on a detection result; and a correction amount arithmetic step of obtaining rotation angle correction amounts of the second axis and the third axis based on the rotation angle of each rotation axis acquired after the correction step in a first posture.

5 Claims, 8 Drawing Sheets

METHOD OF CORRECTING POSITION OF ROBOT AND ROBOT

BACKGROUND OF THE INVENTION

1. Field of the Invention

The present invention relates to a robot position correction method and a robot. Position correction can include zeroing correction or teaching position correction.

2. Description of the Related Art

As disclosed in U.S. Pat. No. 9,796,086 B2, a substrate conveying robot includes a sensor provided at a front end of a hand. In such a robot, in order to improve position control accuracy, a deviation between an actual position of a sensor and a position recognized by the robot can be corrected by swinging the hand around a certain pivot.

In the technique of U.S. Pat. No. 9,796,086 B2, the deviation generated on a single pivot can be corrected. On the other hand, the robot typically has a plurality of rotation axes. For this reason, there is room for improvement in the technology of correcting the deviation.

SUMMARY OF THE INVENTION

An object of the present invention is to improve the position control accuracy of the robot.

According to one aspect of the present invention, in a method of correcting a position of a robot, the robot includes: a base; an arm that is formed by connecting at least two links and connected to the base; a hand that is connected to the arm and includes a first front end and a second front end that are bifurcated; a sensor that is configured to propagate detection light between the first front end and the second front end and to detect whether a target blocks the detection light; and a control device that controls operation of the arm and the hand, a plurality of rotation axes are set so as to be parallel to each other at each of a plurality of connection portions, and the plurality of connection portions include a connection portion of the base and the arm, a connection portion of two adjacent links among the links constituting the arm, and a connecting portion of the arm and the hand. Assuming that three of the rotation axes are a first axis, the method includes: a second axis, and a third axis in order from the rotation axis closest to the base, a step of opposing the hand to the target by driving the arm so as to become a first posture in which the second axis protrudes to a first side and by moving the hand such that the hand becomes in a predetermined initial posture; a first correction step of rotating the hand around the third axis to detect a rotation angle around the third axis when the target blocks the detection light, and correcting a position of the third axis based on a detection result; a second correction step of rotating the arm around the first axis to detect a rotation angle around the first axis when the target blocks the detection light, and locating the first axis, the third axis, and the target on an identical straight line by rotating the arm and/or the hand around the first axis, the second axis, and/or the third axis based on a detection result; and a correction amount arithmetic step of obtaining rotation angle correction amounts of the second axis and the third axis based on the rotation angle of each rotation axis acquired after the second correction step in the first posture.

With this configuration, not only the position of the third axis but also the position of the second axis can be corrected, and the position control accuracy of the robot is improved.

DETAILED DESCRIPTION OF PREFERRED EMBODIMENTS

Figure 1:
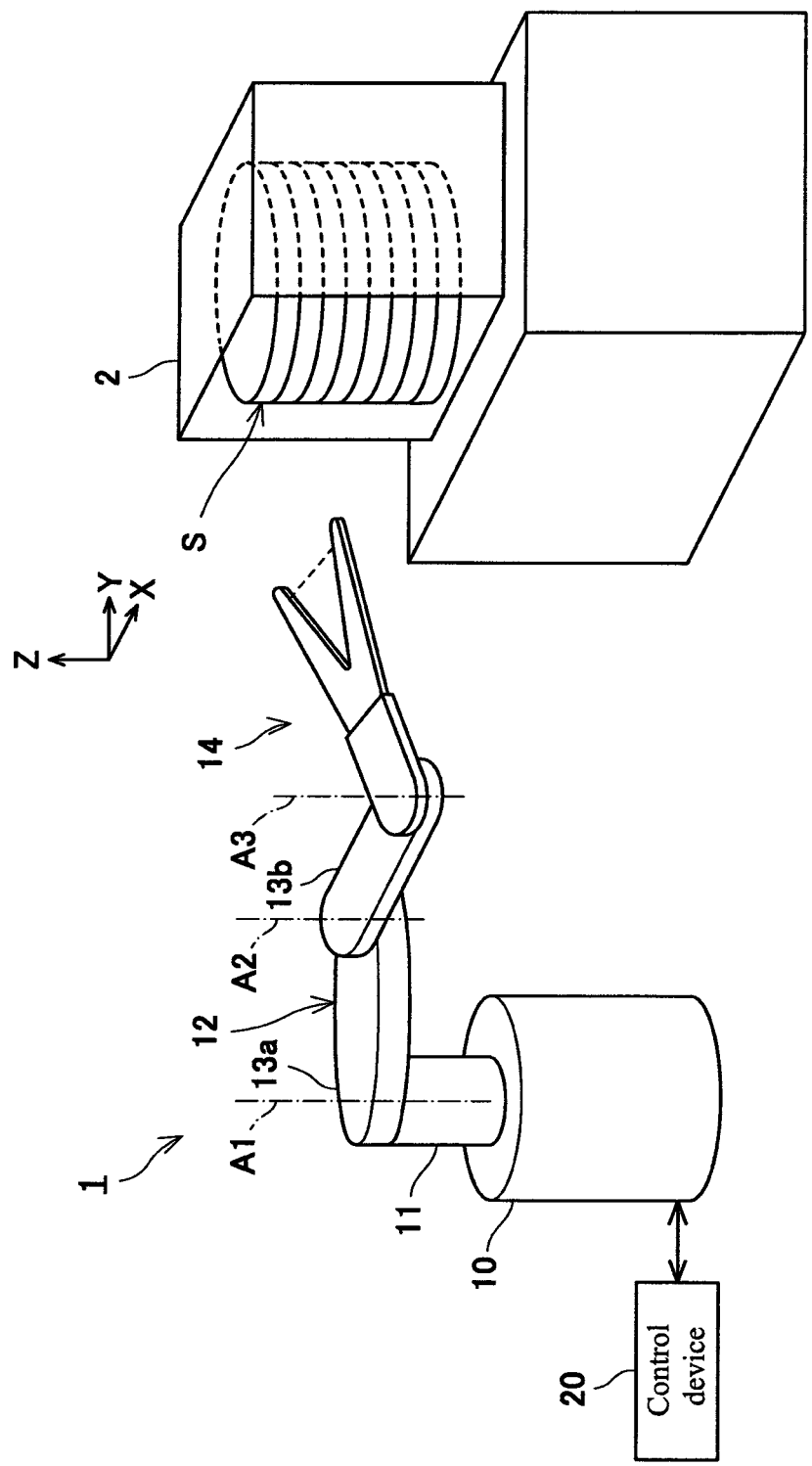
FIG. 1 is a conceptual diagram illustrating a robot according to a first embodiment.

Embodiments will be described below with reference to the drawings. Identical or corresponding elements are denoted by the same reference numerals throughout the drawings, and overlapping description is omitted.

FIG. 1 illustrates a robot 1. The robot 1 can be used to transfer a substrate S in a semiconductor processing facility that manufactures a semiconductor element. The substrate S is a material of a semiconductor element called a wafer, and is formed in a disk shape. A plurality of processing apparatuses are installed in the semiconductor processing facility in order to perform various treatments such as heat treatment, impurity introduction treatment, thin film formation treatment, lithography treatment, cleaning treatment, and flattening treatment, on the substrate S.

For example, the robot 1 transfers the substrate S accommodated in a cassette 2 to the processing apparatus. For example, the cassette 2 is a Front-Opening Unified Pod (FOUP). Although the single cassette 2 is illustrated, an EFEM (Equipment Front End Module) intensively including a plurality of (for example, two or three) cassettes 2 may be installed in the semiconductor processing facility. In this case, preferably the robot 1 is configured to be accessible in each cassette 2 without a travel device.

The robot 1 includes a base 10, an arm 12, a hand 14, a sensor 17, and a control device 20.

The base 10 is fixed to a proper place (for example, a horizontal floor surface) of the semiconductor processing facility (or may be supported on a facility floor surface with the travel device interposed therebetween). Hereinafter, a direction will be described assuming that the base 10 is properly installed on the horizontal floor surface.

An arm 12 is connected to the base 10 with a lifting shaft 11 interposed therebetween. The lifting shaft 11 can move in a vertical direction (Z-direction) relative to the base 10, thereby vertically moving the arm 12 and a hand 14. The arm 12 is formed by connecting at least two links. The hand 14 is connected to the arm 12. The robot 1 or the arm 12 is what is called a horizontal articulated type. In the robot 1, a plurality of rotation axes A1, A2, . . . are set so as to be oriented in parallel with each other in a plurality of connection portions. Any rotation axes A1, A2, . . . are also oriented in the vertical direction (Z-direction).

"The plurality of connection portions" include a connection portion between the base 10 and the arm 12, a connection portion between two adjacent links among links constituting the arm 12, and a connection portion between the arm 12 and the hand 14. A number of rotation axes in the robot 1 corresponds to a number of connection portions provided from the base 10 to the hand 14. For example, in the first embodiment, the arm 12 includes two links of a first link 13a and a second link 13b, and three connection portions and three rotation axes are set in the robot 1. (When the number of links is at least three, at least four rotation axes are set in the robot 1.)

A base end of the first link 13a is connected to the base 10 so as to be rotatable around the rotation axis A1. The base end of the second link 13b is connected to the front end of the first link 13a so as to be rotatable around the rotation axis A2. The hand 14 is connected to the front end portion of the second link 13b so as to be rotatable around the rotation axis A3. The links 13a, 13b and the hand 14 can swing in a horizontal plane (XY-plane). The hand 14 can move along any locus (including a straight line and a curved line) within a horizontal plane according to a posture of the arm 12 (a rotation angle around each of rotation axes A1 to A3).

Three rotation axes A1 to A3 are referred to as a first axis A1, a second axis A2, and a third axis A3 in order from the axis closest to the base 10. The rotation angle around the first axis A1 is referred to as a first rotation angle $\varphi 1$, the rotation angle around the second axis A2 is referred to as a second rotation angle $\varphi 2$, and the rotation angle around the third axis A3 is referred to as a third rotation angle $\varphi 3$. The connection portion (in this embodiment of the two link type, the connection portion between the first link 13a and the second link 13b) in which the central second axis A2 is set is referred to as an "elbow joint" for convenience.

In FIG. 1, when viewed from above (in other words, when viewed from above in the axial direction of the rotation axes A1 to A3), a posture in which an elbow joint Je protrudes to a first side (for example, a left side or a minus side in an X-direction) is referred to as a "first posture", and a posture in which the elbow joint Je protrudes to a second side (for example, a right side or a plus side in the X-direction) opposite to the first side is referred to as a "second posture". The first rotation angle $\varphi 1$ takes a positive value in the first posture, and takes a negative value in the second posture.

Figure 2:
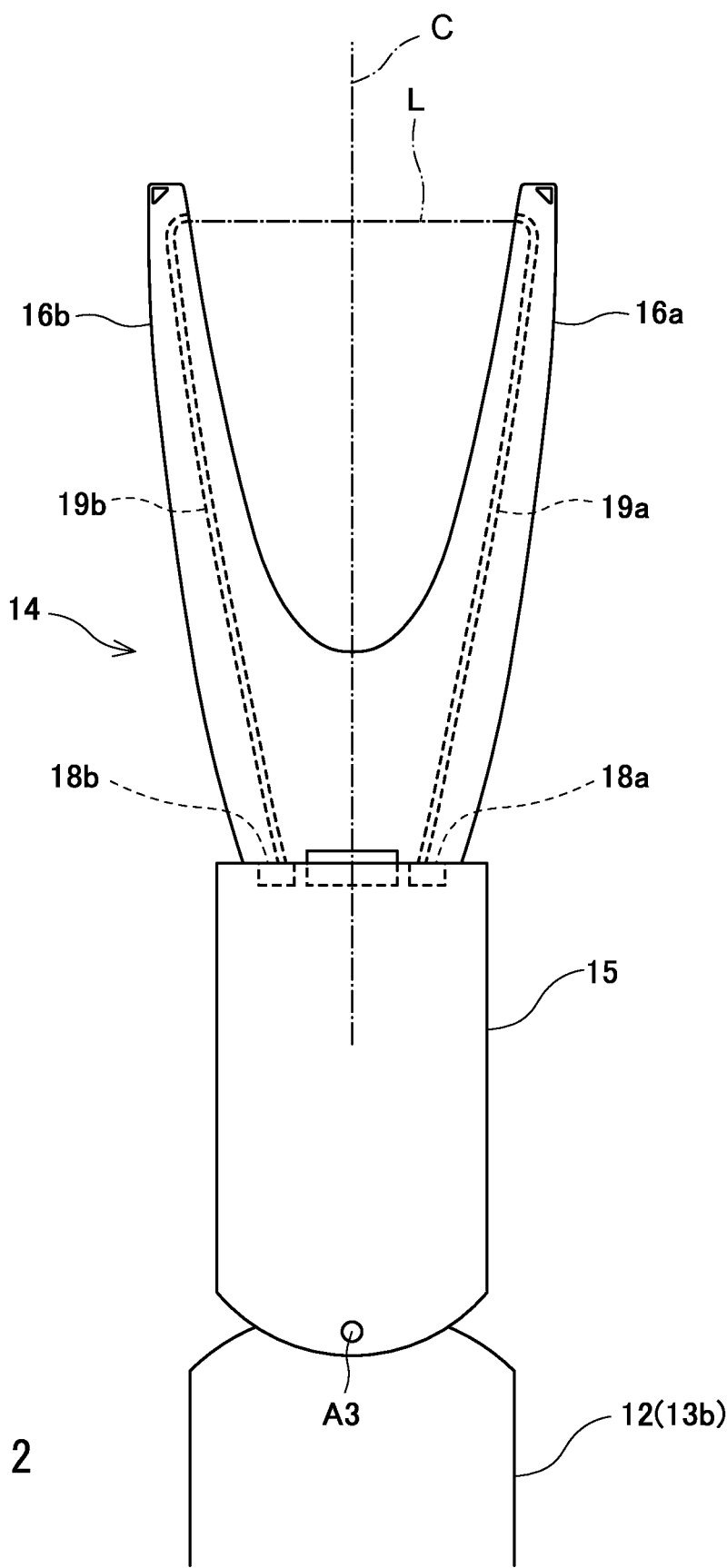
FIG. 2 is a plan view illustrating a hand according to the first embodiment.

FIG. 2 illustrates the hand 14. The hand 14 has a thin plate shape. The hand 14 extends horizontally from the front end of the arm 12. The disk-shaped substrate S can be held on an upper surface of the hand 14, whereby the substrate S is kept in a substantially horizontal posture. A holding structure is not particularly limited, but an edge grip type or a suction type can be adopted. When the arm 12 and the hand 14 lift and/or swing while the hand 14 holds the substrate S, the robot 1 can transfer the substrate S along any trajectory in the X-, Y- and/or Z-direction while kept in a horizontal posture.

The hand 14 is formed in a U-shape when viewed from above. The hand 14 includes a single base end 15 and a first front end 16a and a second front end 16b that are bifurcated from the base end 15. The hand 14 is symmetrical with respect to a reference line C when viewed from above. The base end 15 of the hand 14 is connected to the arm 12 such that the rotation axis A3 is located on the reference line C.

A sensor 17 forms detection light L propagating in a space between the first front end 16a and the second front end 16b of the hand 14. The detection light L has a beam shape. The sensor 17 detects whether an object blocks the detection light L, namely, whether the object exists in the space. In the first embodiment, the sensor 17 is constructed with a transmission type, but may be constructed with a reflective type. The sensor 17 includes a light emitting element 18a and a light receiving element 18b. The light emitting element 18a is driven by the control device 20 to emit detection light L. The detection light L is guided to the first front end 16a through an optical fiber 19a, and output from the first front end 16a to the space. When the object does not exist in the space, the detection light L travels linearly in the space, is incident on the second front end 16b, and is guided to the light receiving element 18b through an optical fiber 19b. The light receiving element 18b outputs a signal corresponding to an amount of received light to the control device 20. A characteristic of the signal output from the sensor 17 changes depending on whether the object blocks the detection light L. The control device 20 can determine whether the detection light L is blocked based on a difference in signal characteristic.

Figure 3:
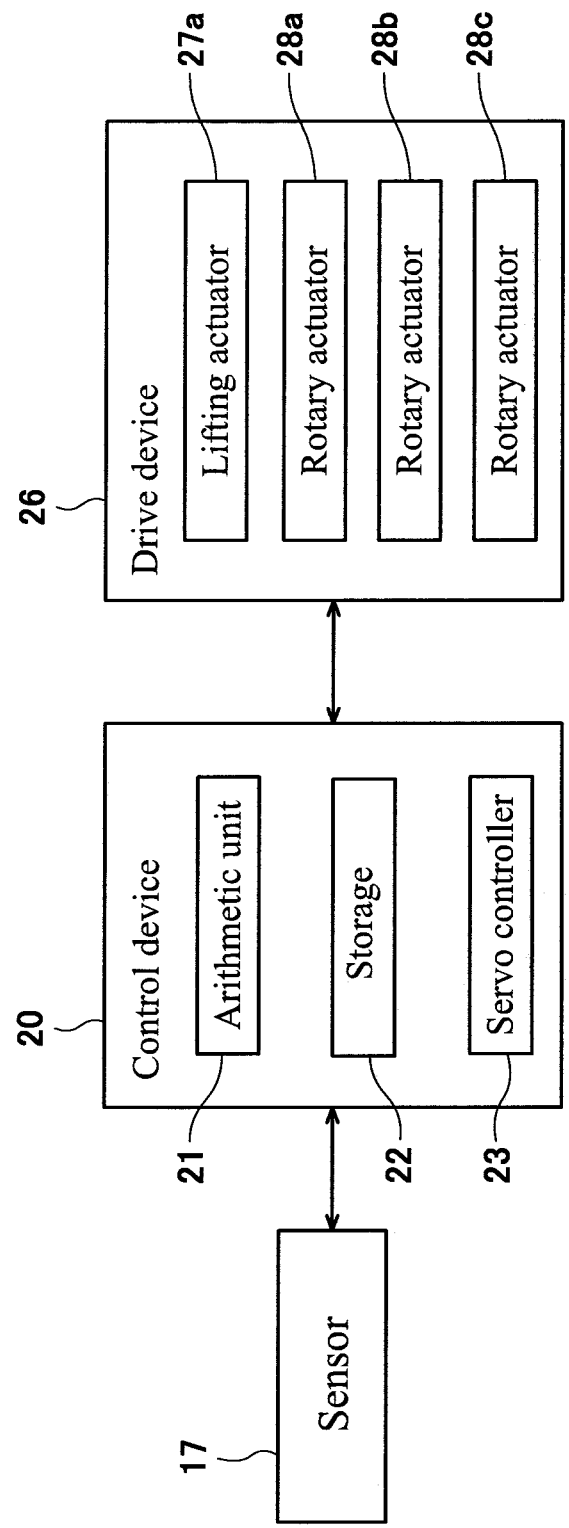
FIG. 3 is a block diagram illustrating a control system of the robot according to the first embodiment.
Figure 4:
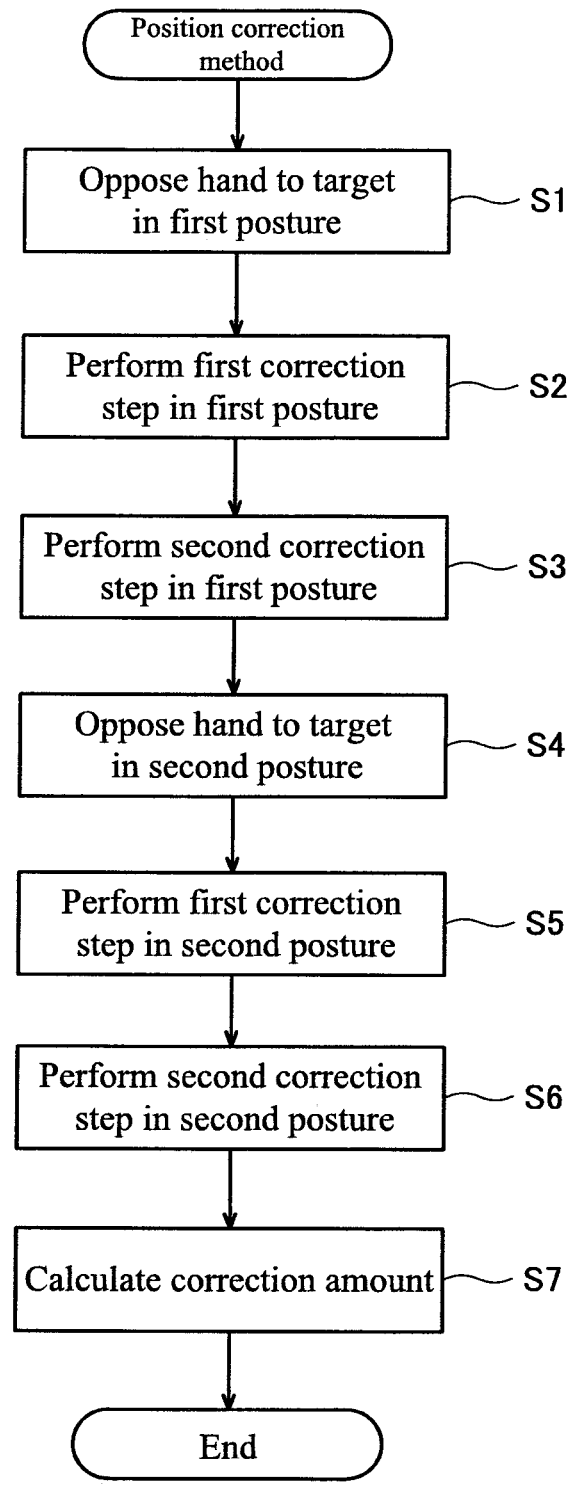
FIG. 4 is a flowchart illustrating a robot position correction method according to the first embodiment.

FIG. 3 illustrates a control system of the robot 1. The control device 20 controls operation of the arm 12 and the hand 14. The control device 20 is a robot controller including a computer such as a microcontroller. The control device 20 is not limited to a single device, but may be constructed with a plurality of devices.

The control device 20 includes an arithmetic unit 21, a storage 22, and a servo controller 23. The storage 22 stores information such as a basic program of the control device 20 and an operation program of the robot 1. The operation program includes not only a work program causing the robot 1 to automatically perform conveying work of the substrate S in practical use in the semiconductor processing facility but also a program correcting a positional deviation caused by an error such as a machining error, an assembly error, and/or an installation error of the robot 1 in advance of the work. The "positional deviation" means a difference between the position, posture, or coordinate (hereinafter sometimes referred to as a software value) of the arm 12 or the hand 14, which are recognized by the control device 20, and the actual position, posture, or coordinate (hereinafter sometimes referred to as an actual value) of the arm 12 or the hand 14, which are generated by the error. A position correction method of the first embodiment is performed by executing the program for the correction. In addition to the operation program, the storage 22 can also temporarily store data acquired during the execution of the program.

The arithmetic unit 21 performs arithmetic processing for robot control, and generates a control command of the robot 1. The servo controller 23 controls a drive device 26 of the robot 1 based on the control command generated by the arithmetic unit 21. For example, the drive device 26 includes a lifting actuator 27a (for example, a ball screw) that lifts the lifting shaft 11 and a plurality of rotary actuators 28a, 28b, and 28c (for example, electric motors) corresponding to the rotation axes A1 to A3. The drive device 26 moves the hand 14 according to the control command from the control device 20. In the following description, a change in posture or position of the arm 12 and the hand 14 are performed through the control performed by the control device 20.

The position correction method performed by the program executed by the control device 20 and the operation of the robot 1 accompanied by the execution of the program will be described below. As a premise for performing the position correction method, a target 40 is installed within the movable range of the robot 1 (at a position where the hand 14 is accessible). The target 40 may be detachably installed in the semiconductor processing facility by a worker, or previously installed in an interior or an outer surface of the cassette 2.

The target 40 has any shape and any posture during the installation. As an example, the target 40 may be formed into a cylindrical shape and called a "pin". In this case, the target 40 has a circular horizontal section. As another example, only a part of the horizontal section of the target 40 may be formed into a circular arc. As an example, the target 40 is installed in a posture extending in the vertical direction.

Figure 5D:
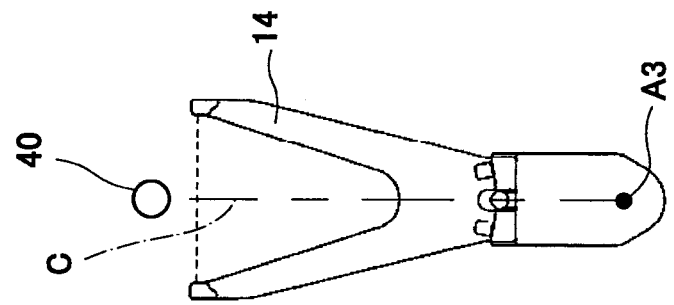
FIGS. 5C and 5D are views illustrating a first correction step in the first posture.
Figure 5C:
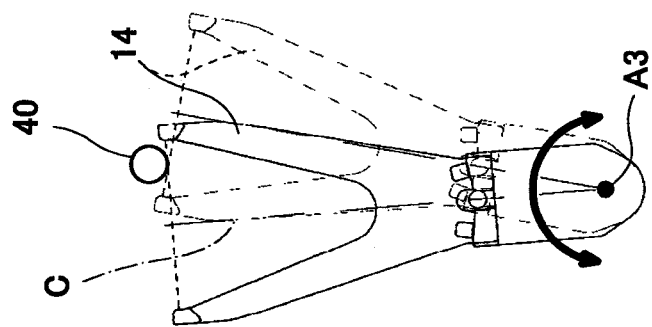
Figure 5B:
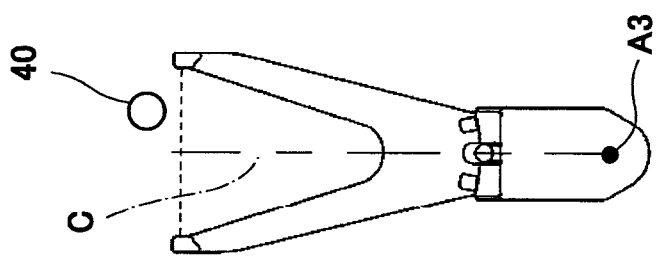
FIG. 5B is a view illustrating an opposing step in a first posture.
Figure 5A:
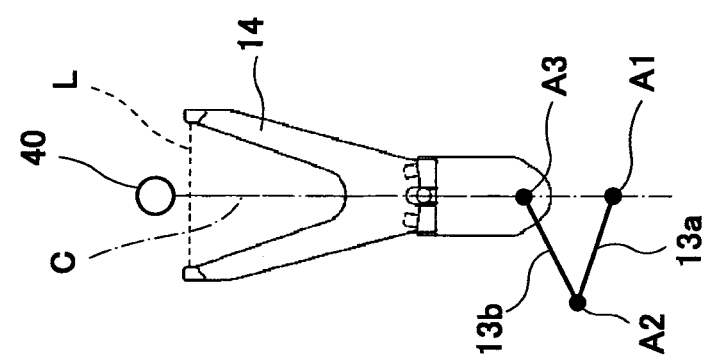
FIG. 5A is a view illustrating a positional relationship between the hand and a target in an ideal state.
Figures 6A, 6B, 6C, 6D:
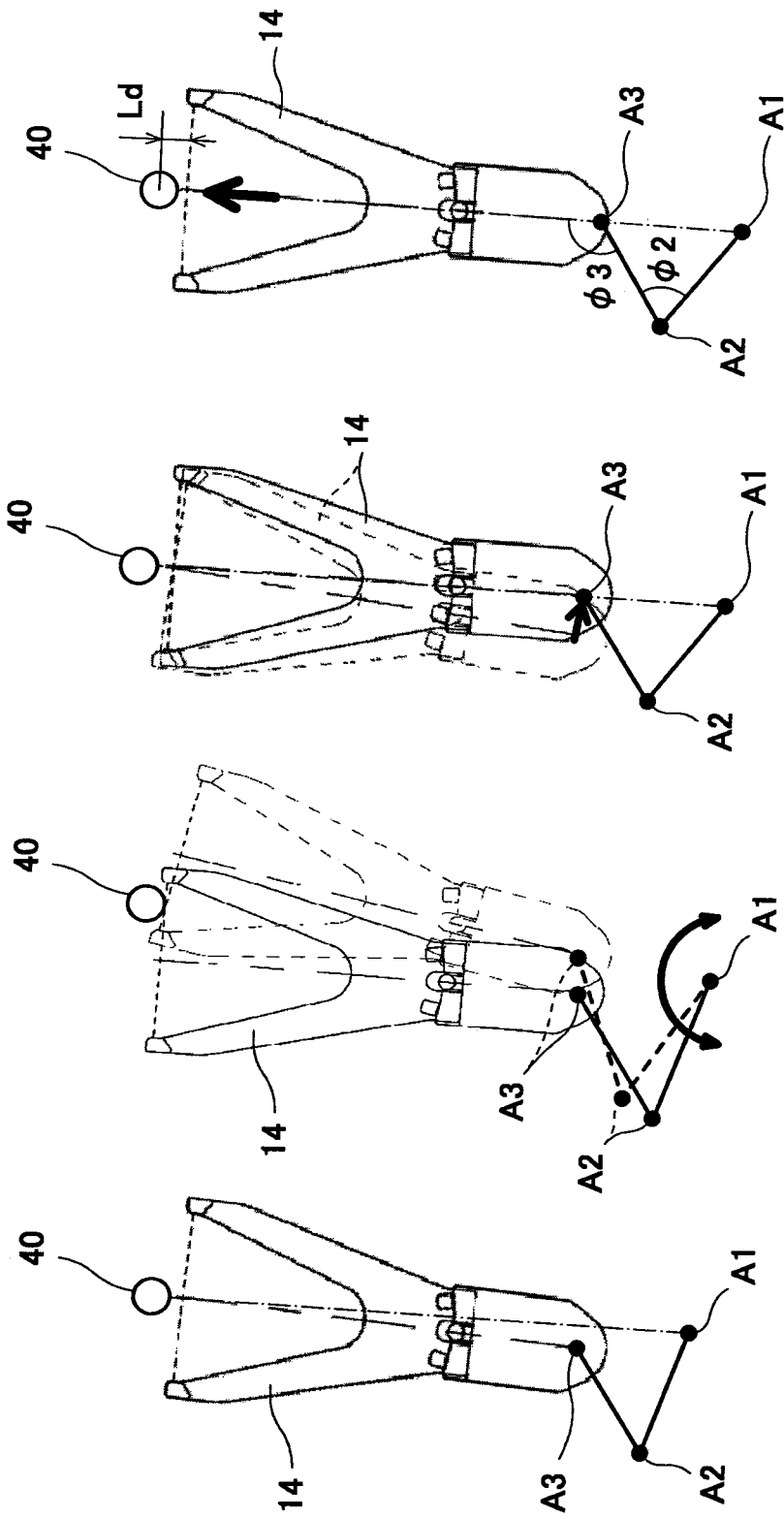
FIGS. 6A to 6D are views illustrating a second correction step in the first posture.
Figure 7A:
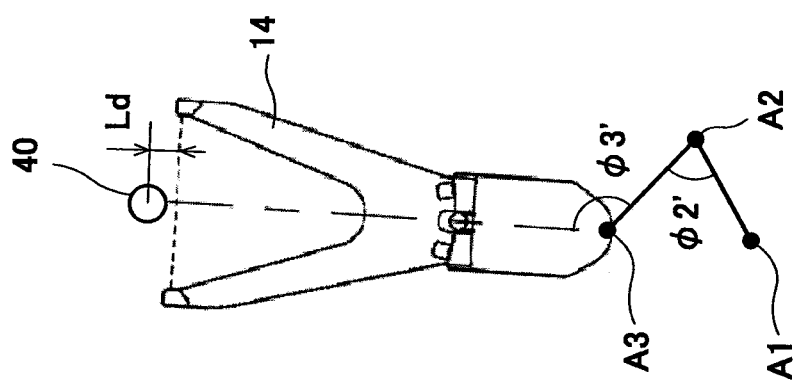
FIGS. 7A and 7B are views illustrating the second correction step from the opposing step in the second posture.
Figure 7B:
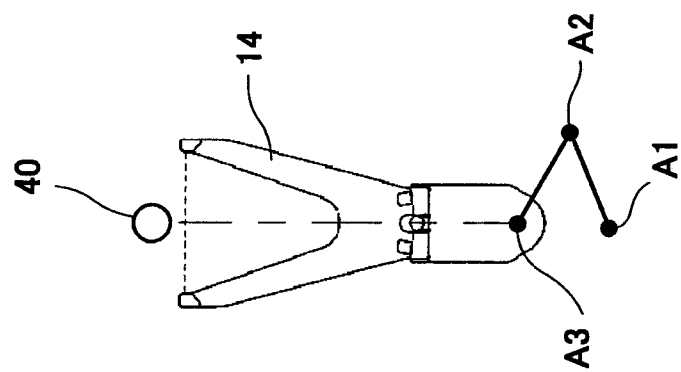

In the following description, it is assumed that a center line C of the hand 14 (or simply the center line C) is a line that passes through the third axis A3 and is perpendicular to the detection light L. In the following description, it is assumed that the center of the target 40 is a circle in the horizontal section of the target 40 or a center of the circular arc. In the position correction method, the hand 14 is opposed to the target 40 while the arm 12 is in a first initial posture (S1). For example, assuming that the arm 12 and the hand 14 do not have any errors, the postures of the arm 12 and the hand 14 are the posture in which the center of the target 40 and the first axis A1 are located on the center line C when viewed from above. Specifically, the control device 20 controls the drive device such that the postures of the arm 12 and the hand 14 become the first initial posture in FIG. 5A. FIG. 5A illustrates an ideal positional relationship to be obtained by the control device 20 by executing step S1. However, actually, even if the arm 12 and the hand 14 are in the first initial posture, the center of the target 40 deviates from the center line C due to accumulation of errors as illustrated in FIG. 5B.

For this reason, first of all, correction necessary to correct the deviation to locate the center of the target 40 on the center line C is performed (S2). In the correction, the technique taught in U.S. Pat. No. 9,796,086 B2 mentioned above can suitably be applied, and incorporated by reference herein. In outline description, the hand 14 is swung around the third axis A3 while the rotation axes of the first axis A1 and the second axis A2 are not operated. The rotation angle of the third axis A3 when the target 40 is rotated clockwise from the first initial posture to block the detection light L and the rotation angle of the third axis A3 when the target 40 is rotated counterclockwise from the first initial posture to block the detection light L are acquired. The difference in rotation angle increases with increasing deviation from the center line C of the target 40, so that a degree of deviation can be determined from the difference in rotation angle. The control device 20 moves the hand 14 based on the determined degree of deviation, thereby locating the center of the target 40 on the center line C as viewed from above (See FIG. 5D).

There is a possibility that the first axis A1 is not located on the center line C when viewed from above even if the first correction step is performed. Accordingly, a second correction step S3 is performed.

In the second correction step S3, first, the arm 12 and the hand 14 are swung around the first axis A1 while the rotation axes of the second axis A2 and the third axis A3 are not operated. The rotation angle of the first axis A1 when the target 40 is rotated clockwise to block the detection light L and the rotation angle of the first axis A1 when the target 40 is rotated counterclockwise to block the detection light L are acquired. Based on the acquired rotation angles, the first axis, the second axis, and the third axis are rotated such that the hand 14 is rotated around the center of the target 40. An amount of rotation movement around the center of the target 40 is decided according to the obtained rotation angle of the first axis A1, and is an amount of rotation movement necessary to overlap the center line C of the hand 14 with a straight line connecting the first axis A1 and the center of the target 40 when viewed from above. When the rotation movement is completed, the hand 14 is linearly moved toward the target 40 along the center line C. The target 40 is linearly moved until the target 40 blocks the detection light L, and the hand 14 is linearly returned by a predetermined distance Ld from the position where the target 40 blocks the detection light L. Ld may be set to zero. A series of pieces of processing from the processing of opposing the hand 14 to the target 40 to the processing of linearly moving the hand 14 by the predetermined distance Ld is repeated until the center of the target 40 and the first axis A1 are located on the center line C when viewed from above. The rotation angle of the second axis A2 and the rotation angle of the third axes A3 are stored when the center of the target 40 and the first axis A1 are located on the center line C as viewed from above while the distance between the target 40 and the detection light L becomes the predetermined distance Ld. Consequently, the second correction step in the first posture is completed. In the second correction step, the location of the center of the target 40 and the first axis A1 on the center line C as viewed from above includes the distance between the center of the target 40 and the center line C and the distance between the first axis A1 and the center line C, which are less than or equal to a predetermined allowable value except for zero. The predetermined allowable value is set to a value small enough to transfer the substrate S using the robot 1.

Next, in a state where the arm 12 is in the second initial posture, the hand 14 is opposed to the target 40 while the arm 12 is in a second initial posture (S4). The series of pieces of processing proceeding from the first initial posture is performed in the same manner (S5, S6). Even in the second posture, the rotation angle of the second axis A2 and the rotation angle of the third axis A3 are stored in the second correction step.

When the software value is matched with the actual value, the absolute values of the second rotation angle acquired in the first posture and the second rotation angle acquired in the second posture are equal to each other, and the absolute values of the third rotation angle acquired in the first posture and the third rotation angle acquired in the second posture are also equal to each other. Unless the absolute values are equal to each other, it means that the deviation exists between the position recognized by the control device 20 and the actual position. Accordingly, an angle value necessary to equalize the absolute values is calculated (S7). The angle value is a correction amount correcting the deviation of the rotation angle around the second axis A2, and is a correction amount correcting the deviation of the rotation angle around the third axis A3. By adding the correction amount to the initially-set software value, the initial position can be corrected (zeroing correction), and the teaching position specified by the work program can be corrected (teaching position correction). For example, the drive device 26 is driven such that the arm becomes the first initial posture by adding the correction amount to the software value that initially decides the first initial posture, which allows the hand 14 to be located at a position away from the target by an assumed distance while the center of the target 40 and the first axis A1 are located on the center line C.

In the first embodiment, not only the third axis but also the positional relationship with the first axis are corrected, so that accuracy of the position correction is improved and accuracy of the position control considering the correction is improved.

Figure 8:
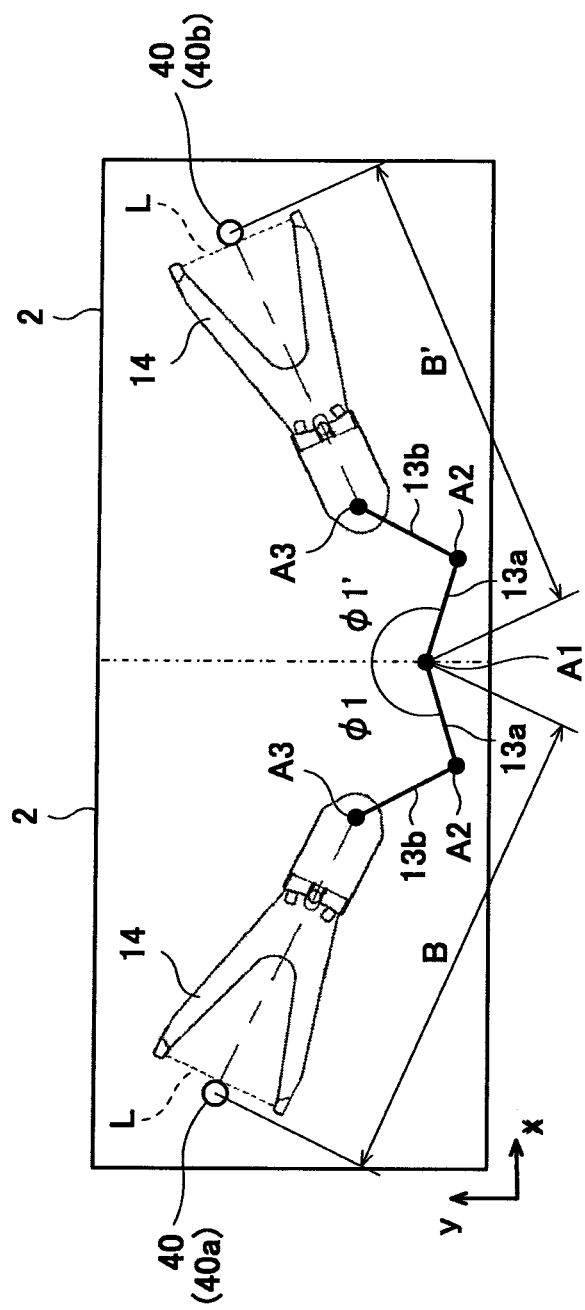
FIG. 8 is a view illustrating a position correction method according to a second embodiment.

As illustrated in FIG. 8 of a second embodiment, in the case that two targets exist, the rotation angle of the first axis can also be corrected. At this point, the two targets are referred to as a first target 40a and a second target 40b. In ideal disposition, two targets 40a, 40b are installed such that the distance from the first axis A1 to the first target 40a and the distance from the first axis A1 to the second target 40b are equal to each other. In the EFEM including at least two cassettes 2, the targets 40a, 40b are easily disposed. The first target 40a is installed in one of the cassettes 2, and the second target 40b is installed in another cassette 2. However, due to an error of the robot 1, two distances are not necessarily equal to each other. Because the second axis A2 and the third axis A3 are corrected through the first correction step, the second correction step, and the correction amount arithmetic step, the final position correction is performed by performing the correction on the software value relating to the first axis A1.

Specifically, the opposing step in the first posture to the second correction step are performed using the first target 40a, and the opposing step in the second posture to the second correction step are performed using the target 40b. In the first posture, a distance B from the first axis to the first target and the rotation angle φ1 of the first axis are acquired. In the second posture, a distance B' from the first axis to the second target and a rotation angle φ1' of the first axis are acquired.

When the distance from the first axis to the first target is actually equal to the distance from the first axis to the second target, the acquired two distances are equal to each other, and the first rotation angle acquired in the first posture and the second rotation angle acquired in the second posture are equal to each other. When the distance from the first axis to the first target is different from the distance from the first axis to the second target, it means that an error exists in the two distances and/or the attachment of the actuator 28a around the first rotation axis. For this reason, when the distance from the first axis to the first target is different from the distance from the first axis to the second target, the correction amount correcting the distance is calculated. When a difference in absolute value of the first rotation angle exists, the correction amount eliminating the difference is calculated.

In the second embodiment, not only the second axis A2 and the third axis A3 but also the rotation angle of the first axis A1 and the distances to the two targets 40a, 40b can be corrected, and the accuracy of the position control can be further improved.

A third embodiment will be described below. In the third embodiment, unlike the first embodiment, after the opposing step in the first posture, the first correction step, and the second correction step are performed, the processing proceeds to the correction amount arithmetic step to calculate the correction amounts relating to the second rotation angle and the third rotation angle. The series of pieces of processing from the opposing step in the second posture to the second correction step is omitted. For this reason, in the correction amount arithmetic step, the correction amount is calculated based on a parameter different from that of the first embodiment, specifically, design parameters of the arm and the sensor 17. The design parameter is previously stored in the storage, and data in the storage is referred to in the calculation. Specifically, the design parameters include a distance from the first axis to the detection light blocking portion of the target 40, a distance (a length of the first link) from the first axis to the second axis, a distance (a length of the second link) from the second axis to the third axis, and a shortest distance from the third axis to the detection light L. By taking these design parameters into consideration, the repeating step in the second posture can be omitted to obtain the correction amounts relating to the second rotation angle and the third rotation angle.

Although the embodiments have been described above, the configuration and method can be added, changed, and/or deleted within the scope of the present invention.

For example, as described above, the present invention can similarly be applied to the arm including at least three links. In the case of the three links, four rotation axes are provided. In this case, when the above method is applied, for example, three rotation axes are set as the third axis, the second axis, and the first axis in order from the side of the hand 14, but the rotation axis in the connection portion between the base 10 and the arm 12 is not operated. Consequently, the rotation angles of the first to third axes defined above can be corrected. Subsequently, three rotation axes are set as the first axis, the second axis, and the third axis in order from the side of the base 10, but the rotation axis in the connection portion between the hand 14 and the arm 12 is not operated. Consequently, even in a robot having at least four rotation axes, the correction accuracy can be improved and the position control accuracy is improved.

What is claimed is:

1. A method of correcting a position of a robot, the robot including:
    a base;
    an arm that is formed by connecting at least two links and connected to the base;
    a hand that is connected to the arm and includes a first front end and a second front end that are bifurcated;
    a sensor that is configured to propagate detection light between the first front end and the second front end and to detect whether a target blocks the detection light; and
    a processor programed to control operation of the arm and the hand,
    a plurality of rotation axes being set so as to be parallel to each other at each of a plurality of connection portions, the plurality of connection portions including a connection portion of the base and the arm, a connection portion of two adjacent links among the links constituting the arm, and a connecting portion of the arm and the hand,
    assuming that three of the rotation axes are a first axis, a second axis, and a third axis in order from the rotation axis closest to the base, the method comprising:
    a step of opposing the hand to the target by driving the arm so as to become a first posture in which the second axis protrudes to a first side and by moving the hand such that the hand becomes in a predetermined initial posture;
    a first correction step of rotating the hand around the third axis to detect a rotation angle around the third axis when the target blocks the detection light, and correcting a position of the third axis based on a detection result;
    a second correction step of rotating the arm around the first axis to detect a rotation angle around the first axis when the target blocks the detection light, and locating the first axis, the third axis, and the target on an identical straight line by rotating the arm and/or the hand around the first axis, the second axis, and/or the third axis based on a detection result; and a correction amount arithmetic step of obtaining rotation angle correction amounts of the second axis and the third axis based on the rotation angle of each rotation axis acquired after the second correction step in the first posture.

2. The method of correcting a position according to claim 1, further comprising before the correction amount arithmetic step, a step of repeatedly driving the arm so as to become a second posture in which the second axis protrudes to a side opposite to the first side, and executing the first and second correction steps, wherein in the correction amount arithmetic step, the rotation angle correction amounts of the second axis and the third axis are obtained based on the rotation angle of each rotation axis acquired after the second correction step in the first posture and the rotation angle of each rotation axis acquired after the second correction step in the second posture.

3. The method of correcting a position according to claim 2, wherein the target includes a first target and a second target, the first and second correction steps in the first posture are performed using the first target, the first and second correction steps in the second posture are performed using the second target, and the rotation angle correction amount of the first axis is obtained in the correction amount arithmetic step.

4. The method of correcting a position according to claim 1, wherein in the correction amount arithmetic step, the rotation angle correction amounts of the second axis and the third axis are obtained based on the rotation angles of each rotation axis acquired after the second correction step in the first posture and design parameters of the arm and the sensor.

5. A robot comprising:

a base;

an arm that is formed by connecting at least two links and connected to the base;

a hand that is connected to the arm and includes a first front end and a second front end that are bifurcated;

a sensor that is configured to propagate detection light between the first front end and the second front end and to detect whether a target blocks the detection light; and a processor programmed to control operation of the arm and the hand, wherein a plurality of rotation axes are set so as to be parallel to each other at each of a plurality of connection portions, the plurality of connection portions include a connection portion of the base and the arm, a connection portion of two adjacent links among the links constituting the arm, and a connecting portion of the arm and the hand, and assuming that three of the rotation axes are a first axis, a second axis, and a third axis in order from the rotation axis closest to the base, the processor is programmed to:

oppose the hand to the target by driving the arm so as to become a first posture in which the second axis protrudes to a first side and by moving the hand such that the hand becomes in a predetermined initial posture;

rotate the hand around the third axis to detect a rotation angle around the third axis when the target blocks the detection light, and correct a position of the third axis based on a detection result;

rotate the arm around the first axis to detect a rotation angle around the first axis when the target blocks the detection light, and locate the first axis, the third axis, and the target on an identical straight line by rotating the arm and/or the hand around the first axis, the second axis, and/or the third axis based on a detection result; and obtain rotation angle correction amounts of the second axis and the third axis based on the rotation angle of each rotation axis acquired after locating the first axis, the third axis, and the target on the identical straight line in the first posture.

* * * * *